United States Patent [19]

Gillemot

[11] 4,127,748
[45] Nov. 28, 1978

[54] CABLE TRANSFER PANEL

[75] Inventor: George W. Gillemot, Santa Monica, Calif.

[73] Assignee: John T. Thompson, Los Angeles, Calif. ; a part interest

[21] Appl. No.: 837,826

[22] Filed: Sep. 29, 1977

[51] Int. Cl.² ............................................. H04Q 1/18
[52] U.S. Cl. ................................. 179/98; 179/1 PC; 200/1 R
[58] Field of Search .................... 179/98, 91 R, 1 PC, 179/91 A, 175 R, 175.1, 175.21; 307/112–115, 147; 339/18 R, 18 B, 18 C; 200/1 R, 16 R; 361/424–428, 350; 174/60

[56] References Cited

U.S. PATENT DOCUMENTS

| | | | |
|---|---|---|---|
| 3,704,347 | 11/1972 | Brown | 179/1 PC |
| 3,736,388 | 5/1973 | Thompson et al. | 179/175 |
| 3,920,927 | 11/1975 | De Luca | 179/98 |
| 4,029,914 | 6/1977 | Schmidt et al. | 200/1 R |

Primary Examiner—Kathleen H. Claffy
Assistant Examiner—Gerald L. Brigance
Attorney, Agent, or Firm—Harris, Kern, Wallen & Tinsley

[57] ABSTRACT

A cable transfer system for a telephone central office main frame and cable vault. A cable transfer panel for permanent or temporary connection to the main frame while positioned remote from the main frame, and providing for interconnection of up to 200 line pairs at a time with a single switch operation for each interconnection. A cable transfer panel also providing for cross connecting of line pairs and for connecting of test equipment to the line pairs, as desired.

13 Claims, 6 Drawing Figures

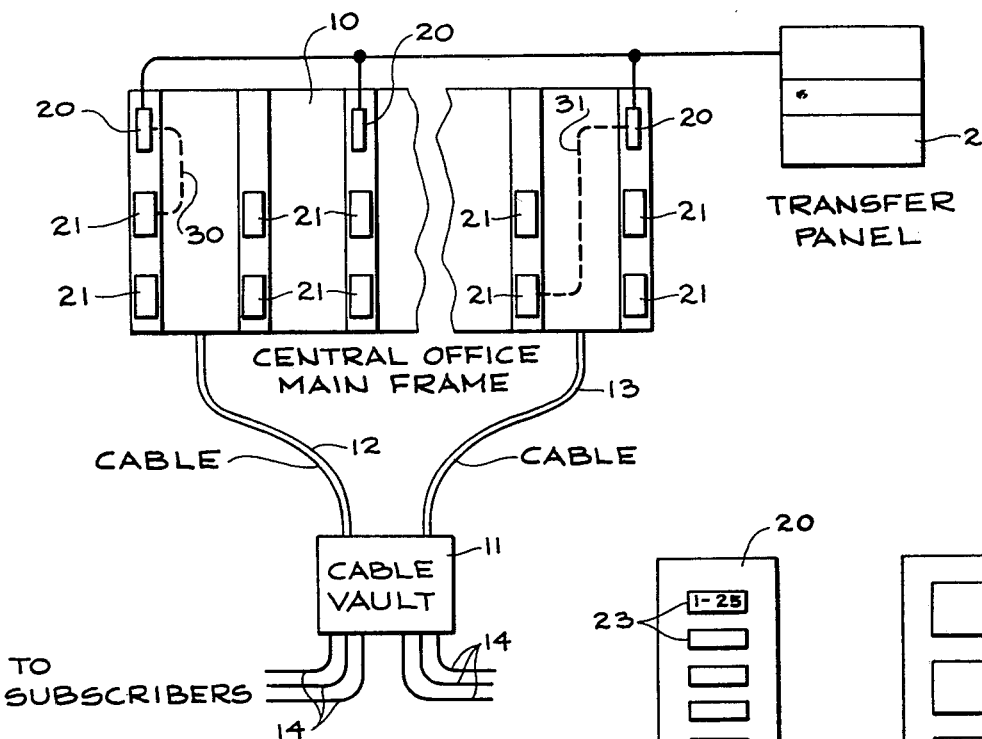
FIG. 1.
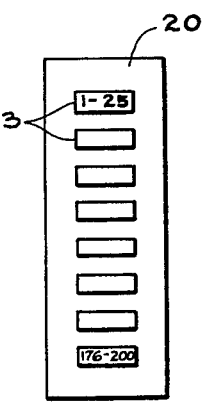 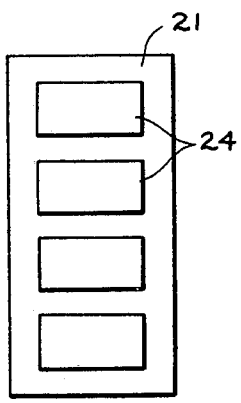
FIG. 2.  FIG. 3.
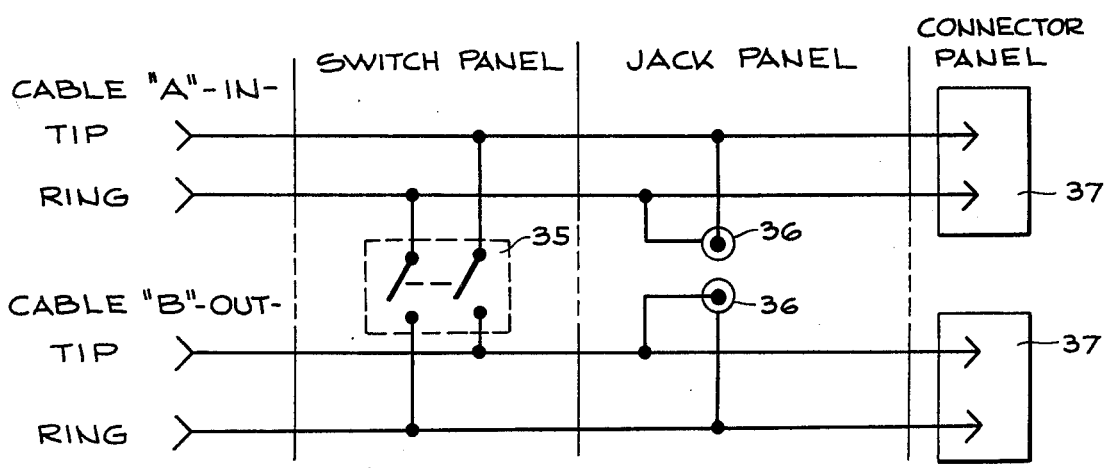
FIG. 5.

CABLE TRANSFER PANEL

BACKGROUND OF THE INVENTION

This invention relates to telephone central office equipment and in particular, to a new and improved system for making cable transfers at the central office main frame and cable vault.

In a telephone central office, the subscribers line pairs come into a terminal area usually referred to as the cable vault. The line pairs are run from the terminals in the cable vault to terminals on the main frame by a cable, with electrical fault protection of subscribers being performed at the main frame. Maintenance and service functions are performed by telephone personnel at the cable vault and at the main frame, and one such operation is the transfer of line pairs from one location on the main frame via one cable to another location on the main frame via another cable. This operation is usually referred to as a cable transfer and may occur when a new cable is placed in service to supplement an existing cable.

A cable transfer operation typically is performed in the following manner. The old cable terminals for the line pair to be transferred are located at one part of the main frame. Temporary jumpers are run from these terminals to the new location cable terminals at the main frame to which this particular subscriber is to be connected. These jumpers are run across the face of the main frame, and the rest on the floor or in wire hangers. In the cable vault, the line pair in the new cable which is connected to these jumpered terminals is located, and then connected to the corresponding terminals of the old cable in the cable vault, after which the line pair of the old cable is removed. This operation is repeated for each line pair to be transferred. This requires the substantially continuous attention of a workman in the main frame area and a second workman in the cable vault. This also requires the running of jumpers across the main frame which is time consuming and hazardous and often inhibits work at the main frame.

In the past, a piece of switching equipment has been used in performing the cable transfer operation. A desk size console is installed in the central office and is connected by appropriate cables to the main frame, with plug in patch cords providing for connecting a plurality of line pairs from the main frame to the console. In one embodiment, provision is made for connecting up to 300 pairs at a time to the console. Typically 150 line pairs will be connected to a first cable and 150 line pairs will be connected to a second cable. The console has a plurality of switches which permit connecting each line pair to a jack. A workman at the console can select a first switch setting to connect a desired line pair of one cable to a corresponding jack and then select another switch setting to connect a line pair of the second cable to a corresponding jack, after which the line pairs can be interconnected by a patch cord inserted into the two selected jacks. This operation corresponds to the jumpering across the main frame previously discussed, after which the transfer is made by the second workman in the cable vault.

There are a number of disadvantages to this system. The console is large and requires substantially continuous attention by a workman. In order to produce the jumper connection, two switches must be actuated and a patch cord inserted.

It is an object of the present invention to provide a new and improved cable transfer system utilizing a small cable transfer panel at which the cable jumpering operation can be performed by actuation of a single switch. A further object is to provide such a cable transfer system wherein a plurality of line pairs can be jumpered at one time, with no further attention being required until the cable transfer has been completed for all of the lines so jumpered.

Additional objects include provision for interconnection of any line pairs by a patch cord, temporary and/or permanent connection of the cable transfer panel to the main frame and provision for connection of any group of line pairs of the main frame to the transfer panel, provision for connection of test equipment, and talk and tone circuits.

An additional object is to provide at one centralized location in a remote uncongested area of a central office, interconnection facilities as well as facilities for testing, taging, cross connecting, verifying and similar analytical operations.

SUMMARY OF THE INVENTION

A cable transfer panel for a telephone central office main frame is connected to the main frame and may be positioned adjacent or remote from the main frame. A plurality of switches is mounted in the panel, typically 200, with each switch having a first pair of fixed poles, a second pair of fixed poles and a pair of moving arms for interconnecting corresponding poles when the switch is closed. A first cable with a plurality of line pairs, typically 200, has a line pair connected to the first pair of poles of each corresponding switch, and a second similar cable has a line pair connected to the second pair of poles of each corresponding switch, so that the line pairs of the two cables may be interconnected by closing the corresponding switch. Means are provided for connecting the first and second cables to line pairs at the main frame. This may be accomplished by providing cable connectors at the transfer panel for connecting by patch cords to cable connectors at the main frame. Alternatively, the cables of the transfer panel may be run to the main frame and terminate at cable connectors, with shorter patch cords, typically utilizing front tap shoes, providing interconnections between the main frame and the transfer panel connectors fixed at the main frame. In the preferred embodiment, a jack is provided at the transfer panel for each line pair permitting cross connection of any line pairs by patch cords. Also, auxiliary switches and jacks are provided at the transfer panel for talk and tone circuits and other auxiliary services.

BRIEF DESCRIPTION OF THE DRAWINGS

FIG. 1 is a diagram illustrating the installation of the presently preferred embodiment of the invention including transfer panel, central office main frame and cable vault;

FIGS. 2 and 3 are enlarged views of two of the cable connector panels at the main frame of FIG. 1;

FIG. 5 is an electrical schematic of one of 200 line pair circuits of the transfer panel of FIG. 4.

DESCRIPTION OF THE PREFERRED EMBODIMENTS

Figure 6:
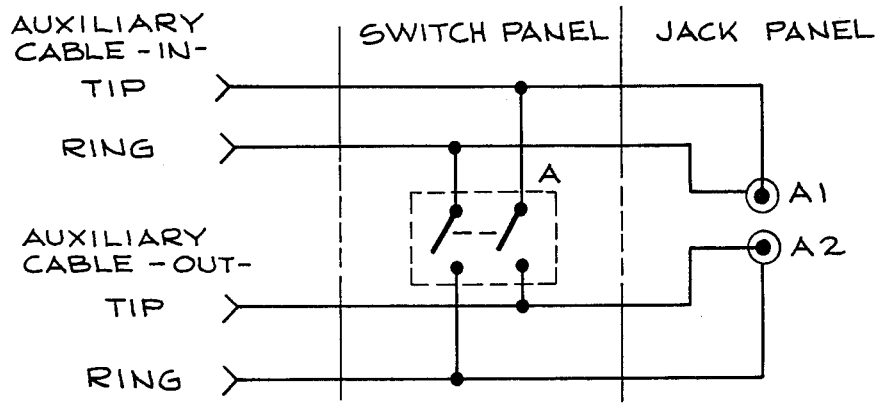
FIG. 6 is an electrical schematic of one of the auxiliary circuits of the panel of FIG. 4.

FIG. 1 illustrates a typical telephone central office main frame 10 connected to a typical cable vault 11 via cables 12 and 13. Individual lines 14 run from the cable vault to the various subscribers. Each of the cables 12, 13 has a large number of line pairs which are connected at terminal boards in the cable vault. Individual subscribers line pairs are connected to cable line pairs at the terminal boards as required for the desired service. Typically these terminals are positioned in a vault below ground and hence this terminal area is referred to as a cable vault. However, the terminal area for the cables and subscribers lines may be located at any physical position and the term "cable vault" is intended to refer to this terminal area. The line pairs of each of the cables are also connected to terminals in the main frame with the central office switching equipment also being connected to these terminals.

Cable connector panels 20 are mounted on the main frame in locations as desired. Cable connector panels 21, sometimes used as line pair protection groups, are also mounted on the main frame in locatios as desired. Typical configurations for the panels 20, 21 are shown in FIGS. 2 and 3, respectively. Each panel 20 may have eight cable connectors 23 mounted thereon, and each panel 21 may have four cable test connectors or fromt tap shoes 24 mounted thereon. The numbers given for the quantities of connectors, line pairs and the like are for purposes of example only and correspond to the numbers utilized in one embodiment of the invention presently in use. Each of the cable connectors 23 provides for connecting 25 line pairs, so that each connector panel 20 provides for connecting 200 line pairs. Each of the test connectors 24 provides for connecting 50 line pairs so that each of the panels 21 provides for connecting 200 line pairs. In a typical installation with say for example 6 fo the connector panels 20, the first three connector panels will be connected in parallel with each other and to cable A of a cable transfer panel 28. The last three of the panels 20 will be connected in parallel with each other and to cable B of the transfer panel. Each of the connector panels 21 will be connected to 200 line pairs of the main frame. With this installation, any group of line pairs of the main frame may be readily connected to any group of line pairs in cable A or cable B by means of a patch cord having a connector for mating with the test connector 24 at one end and two connectors for mating with two of the connectors 23 at the other end. One such patch cord is indicated at 30 and another at 31 in the main frame. The patch cords preferably utilize from tap shoes for making the connections to the connectors 24 of the panels. Many present day main frames already have the connector panels 21 installed for other service operations. As will be seen from the subsequent description, the installation as shown in FIG. 1 permits connecting selected line pairs of the main frame to the transfer panel with relatively short patch cords, eliminating requirements for temporary jumpering between main frame terminals and eliminating long stretches of wires on the floor or hanging across the main frame.

Figure 4:
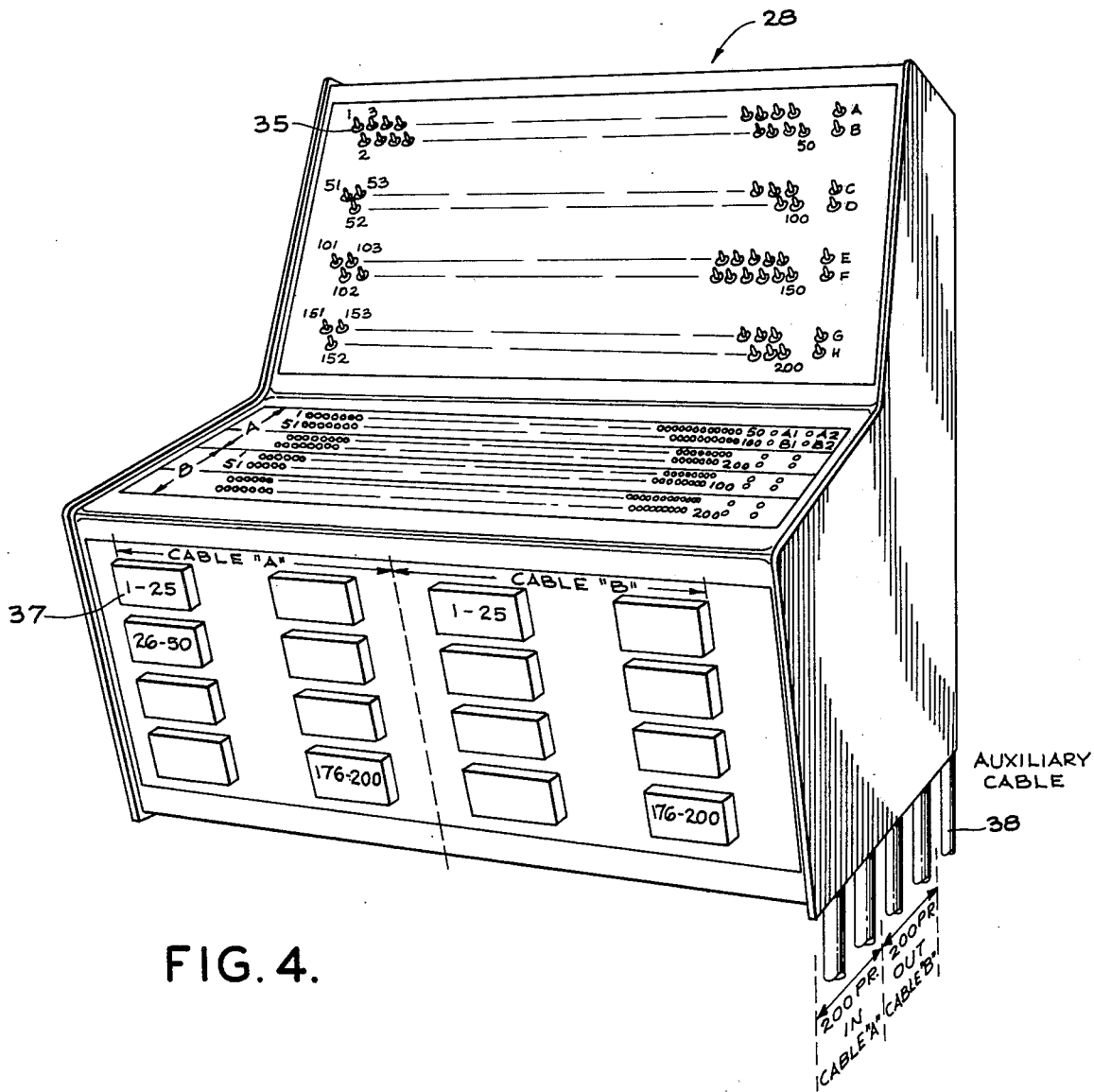
FIG. 4 is a perspective view of the transfer panel of FIG. 1.

The cable transfer panel 28 is illustrated in FIG. 4. A plurality of single throw double pole switches 35 is mounted on the panel and in the embodiment illustrated, 200 switches are utilized numbered 1 through 200. Eight auxiliary switches of the same type are also mounted on the panel, identified as A through H. Cable A from the main frame has a line pair connected to the first pair of poles of each of the 200 switches. Similarly, cable B has a line pair connected to the second pair of poles of each of the 200 switches. An electrical schematic for one of these switches is set out in FIG. 5.

Jacks are also provided at the transfer panel for each line pair of each cable, with the jacks numbered 1–200 for cable A and 1–200 for cable B. Two additional jacks are provided for each auxiliary switch, with the jacks for the switch A identified as A1 and A2.

Cable connectors 37 are also mounted on the transfer panel and in the embodiment illustrated, eight cable connectors are provided for cable A and eight for cable B, with each connector handling 25 line pairs. The line pairs for the connectors for cable A are connected to the line pairs in cable A and similarly, the line pairs for the connectors of cable B are connected to the line pairs of cable B, as illustrated in FIG. 5. An auxiliary cable 38 provides connections to the auxiliary switches A–H and auxiliary jacks A1–H2, with the auxiliary circuit A shown in FIG. 6.

The cable transfer system of the present invention may be used to transfer a subscriber's line pair from a first terminal location at the main frame serviced by a first cable 12 to another terminal location at the main frame serviced by the cable 13, without interrupting service to the subscriber. In the embodiment illustrated, transfer of up to 200 line pairs may be accomplished with a single setting of the transfer panel. In this operation, the cable connector or connectors 24 which are connected to the line pairs at the main frame to be transferred, are connected to the appropriate cable connector or connectors 23 of a connector panel 20. For example, the jumper cable 30 may be utilized to make this connection. Up to 200 such connections can be made utilizing four of the jumper cables. Similarly, the line pair terminals at the main frame of the cable 13 to which the transfer is to be made are connected via cable connectors 24 and 23 by additional jumpers, such as the jumper 31. Preferably, the jumper 30 will be connected to a connector panel 20 serving one of the cables of the transfer panel and the jumper 31 will be connected to a connector panel serving the other cable of the transfer panel, such as cable A for jumper 30 and cable B for jumper 31. A test may be conducted to verify the old and new cable counts and bad pairs using connector panel 37 prior to making a transfer. When it is time to make the transfer, the appropriate switches 35 at the transfer panel are moved to the closed position, thus interconnecting the corresponding line pairs of the cables 12 and 13. All 200 switches may be closed if desired. The workman in the cable vault can now proceed with making the connections and cuts at the cable vault, without requiring any further work at the main frame. Each line pair in the cable 13 can be identified in the cable vault by placing an appropriate signal on the corresponding line pair in the cable 12. The workman then connects the cable 13 line pair to the appropriate terminals from the subscriber and then disconnects the cable 12 line pairs leading to the main frame. This operation is performed for each line pair to be transferred. When the transfer is complete in the cable vault, the switches at the transfer panel may be returned to the open position and then the jumper cables 30 and 31 may be shifted to connect other main frame terminals to the transfer panel.

When it is desired to make a transfer from one line pair to another line pair which are not correspondingly numbered in cables A and B, the interconnection at the transfer panel may be made by utilizing a patch cord plugged into the jacks associated with the two line pairs. Then the transfer procedure in the cable vault proceeds as previously described.

If desired, the cable connectors 24 at the connector panels 21 may be directly connected to the cable connectors 37 at the transfer panel by a jumper cable, rather than utilizing the connector panels 20 and associated cables. The operation of the transfer panel is the same as previously described. The connectors 37 at the transfer panel provide for access to each line pair connected at the connector panels 20, thereby permitting easy connection of test equipment to the lines being transferred. One use for these connectors 37 is the connection of automatic number identification equipment to verify the accuracy of records.

The jacks 36 provide direct access to each line pair for testing, for introducing optional signaling lamps, for utilization as talk lines for repairmen and for signaling during maintenance and repair.

I claim:

1. In a cable transfer panel for a telephone central office main frame, the combination of:
   a plurality of switches mounted in said panel, each of said switches having a first pair of fixed poles, a second pair of fixed poles and a pair of moving arms for interconnecting corresponding poles of said first and second pairs when the switch is moved from the open to the closed position;
   a first cable in said panel and having a plurality of line pairs, with each line pair connected to the first pair of poles of a corresponding switch;
   a second cable in said panel and having a plurality of line pairs with each line pair connected to the second pair of poles of a corresponding switch, whereby corresponding line pairs of said first and second cables are interconnected by closing the corresponding one of said switches;
   first means for connecting said first cable to a plurality of line pairs at the main frame; and
   second means for connecting said second cable to a plurality of line pairs at the main frame, whereby one line pair at the main frame may be connected to another line pair at the main frame by actuation of only one of said switches.

2. A cable transfer panel as defined in claim 1 including a plurality of telephone jacks mounted in said panel, with line pairs of said first and second cables connected to corresponding jacks, whereby any one of said line pairs can be connected to any other of said line pairs by a patch cord having a plug at each end thereof.

3. A cable transfer panel as defined in claim 1 wherein each of said first and second means for connecting includes a first cable connector mounted in said panel.

4. A cable transfer panel as defined in claim 3 wherein each of said first and second means for connecting also includes a second cable connector mounted at the main frame and connected in parallel with said first cable connector.

5. A cable transfer panel as defined in claim 1 wherein each of said first and second means for connecting includes a cable connector mounted at the main frame.

6. A cable transfer panel as defined in claim 1 wherein each of said first and second means for connecting includes a plurality of cable connectors connected in parallel and mounted at the main frame.

7. In cable transfer system for a telephone central office main frame, the combination of:
   a cable transfer panel comprising a plurality of switches, each of said switches having a first pair of fixed poles, a second pair of fixed poles and a pair of moving arms for interconnecting corresponding poles of said first and second pairs when the switch is moved from the open to the closed position,
   a first cable having a plurality of line pairs, with each line pair connected to the first pair of poles of a corresponding switch, and
   a second cable having a plurality of line pairs, with each line pair connected to the second pair of poles of a corresponding switch, whereby corresponding line pairs of said first and second cables are interconnected by closing the corresponding one of said switches;
   a plurality of first cable connectors mounted at the main frame and connected to line pairs of the main frame;
   first means for connecting said first cable to one of said first cable connectors; and
   second means for connecting said second cable to another of said first cable connectors, whereby one line pair at the main frame may be connected to another line pair at the main frame by actuation of only one of said switches.

8. A cable transfer system as defined in claim 7 wherein each of said first and second means for connecting includes a second cable connector mounted at the main frame and connected to said first and second cables, respectively; and including
   a plurality of jumper cables, each having a connector at one end for mating said first cable connector and a connector at the other end for mating with second cable connector.

9. A cable transfer system as defined in claim 8 wherein each of said first and second means for connecting also includes a third cable connector mounted on said cable transfer panel and connected in parallel with the corresponding second cable connector.

10. A cable transfer system as defined in claim 7 wherein each of said first and second means for connecting includes a second cable connector mounted at said cable transfer panel and connected to said first and second cables, respectively; and including
    a plurality of jumper cables, each having a connector at one end for mating with said first cable connector and a connector at the other end for mating with said second cable connector.

11. A cable transfer system as defined in claim 7 wherein said cable transfer panel includes a plurality of telephone jacks with line pairs of said first and second cables connected to corresponding jacks, whereby any of said line pairs can be connected to any other of said line pairs by a patch cord having a plug at each end thereof.

12. A method of transfering line pairs from a first telephone cable to a second telephone cable where the first and second cables run from a central office main frame to a cable vault, including steps of:
   (a) at the main frame connecting a plurality of line pairs of the first cable to a corresponding plurality of double pole single throw switches;
   (b) at the main frame connecting a corresponding plurality of line pairs of the second cable to the switches, with one first line cable pair and one second cable line pair connected to each switch;

(c) actuating the switches to interconnect the corresponding line pairs of the first and second cables, with one switch interconnecting two line pairs;

(d) at the cable vault connecting a line pair of the second cable to the terminals with the corresponding line pair of the first cable;

(e) removing the line pair of the first cable from the terminals; and (f) at the cable vault repeating steps (d) and (e) for each line pair to be transferred.

13. The method of claim 12 including the steps of:

(g) at the main frame connecting a plurality of line pairs of the first cable and the second cable to telephone jacks;

(h) interconnecting selected jacks to connect predetermined line pairs of the first and second cable; and (i) at the cable vault performing steps (d), (e) and (f) for the interconnected line pairs.

* * * * *